(12) United States Patent
Wilkinson et al.

(10) Patent No.: US 9,567,084 B2
(45) Date of Patent: Feb. 14, 2017

(54) AIRCRAFT WASTE BIN EXTRACTOR

(71) Applicant: B/E Intellectual Property, Inc., Wellington, FL (US)

(72) Inventors: Michael Wilkinson, Hitchin (GB); Hayley Mortimer, Bedford (GB)

(73) Assignee: B/E Intellectual Property, Inc., Wellington, FL (US)

( * ) Notice: Subject to any disclaimer, the term of this patent is extended or adjusted under 35 U.S.C. 154(b) by 100 days.

(21) Appl. No.: 14/662,044

(22) Filed: Mar. 18, 2015

(65) Prior Publication Data

US 2015/0191248 A1 Jul. 9, 2015

Related U.S. Application Data

(63) Continuation of application No. 13/606,832, filed on Sep. 7, 2012, now Pat. No. 8,998,136.

(60) Provisional application No. 61/534,198, filed on Sep. 13, 2011.

(51) Int. Cl.
*B64D 11/04* (2006.01)
*B65F 1/14* (2006.01)

(52) U.S. Cl.
CPC ............. *B64D 11/04* (2013.01); *B65F 1/1426* (2013.01); *B65F 1/1468* (2013.01); *B65F 1/1473* (2013.01); *B65F 2230/00* (2013.09); *Y02T 50/46* (2013.01)

(58) Field of Classification Search
CPC ...... B64D 11/04; B65F 1/1426; B65F 1/1468; B65F 1/1473
See application file for complete search history.

(56) References Cited

U.S. PATENT DOCUMENTS

| | | |
|---|---|---|
| 4,120,485 A | 10/1978 | McConnell |
| 6,138,558 A | 10/2000 | Harrington |
| 7,089,852 B2 | 8/2006 | Iacobucci |
| 2006/0255609 A1 | 11/2006 | Squyres et al. |

OTHER PUBLICATIONS

International Search Report, Nov. 23, 2012, 2 pages, from PCT/US12/054796, published as WO2013/039995 on Mar. 21, 2013.

*Primary Examiner* — Nicholas McFall
(74) *Attorney, Agent, or Firm* — Shumaker, Loop & Kendrick, LLP

(57) ABSTRACT

An aircraft galley waste bin extraction unit is disclosed having a first compartment formed by a plurality of walls that conform with walls of the waste bin, an extraction chamber adjoining the first compartment and sharing a common wall, and a platform within the common wall including a hinged bottom edge that allows the platform to pivot into a horizontal position against a rest on an extraction chamber side wall, the deploying of the platform forming a window through which the waste bin can pass through from the first compartment to the extraction chamber. The unit preferably also includes retractable ramp extendable from the platform to a ground surface to guide the waste bin from the extraction unit to the ground.

6 Claims, 4 Drawing Sheets

AIRCRAFT WASTE BIN EXTRACTOR

CROSS-REFERENCES TO RELATED APPLICATIONS

This continuation application is based on U.S. Ser. No. 13/606,832, filed on Sep. 7, 2012, which claims priority from U.S. Provisional Application No. 61/534,198, filed Sep. 13, 2011 incorporated by reference in its entirety.

Designers of aircraft galleys are continuously striving to make the working space of the galley both safe and efficient while preserving the overall objectives of weight reduction and effective space management. Every aspect of the galley is evaluated for compliance with these principles while focusing on utility and personnel safety. All equipment must be adequately secured to prevent the equipment from moving or dislodging during flight, and every effort must be made to make the equipment easily accessible. One example of equipment that must be securely stowed and readily accessible is the galley waste bin that is used to collect and store waste from the flight. In some cases waste bins can hold over thirty (30) kilograms of waste, making it necessary to store it safely. However, the bin also must be capable of being moved easily if it needs to be emptied during the flight. The waste bin is typically kept in a waste bin compartment that includes some opening that allows a flight attendant to place rubbish and waste into the bin. When the bin needs to be emptied, the flight attendant reaches into the compartment and lifts the bin out so that it can be emptied.

Lifting and maneuvering such a heavy object, typically stowed in the lower half of a compartment, can lead to back strain as well as other injuries for flight attendants tasked with emptying the bins. Moreover, the waste bin must be rigidly secured to prevent the bin from shifting during flight (and to avoid annoying rattling of the bin due to vibration). Present solutions are unacceptable as they make the extraction of the bin difficult and present a safety concern.

SUMMARY OF THE INVENTION

The present invention is a waste bin and compartment extractor arrangement that provides a secure holding area for the waste bin, but where a side wall conveniently drops down to form a platform from which the bin can be easily moved from its enclosure and slid/rolled down a ramp to easily remove the bin for emptying.

DETAILED DESCRIPTION OF THE PREFERRED EMBODIMENTS

Figure 1:
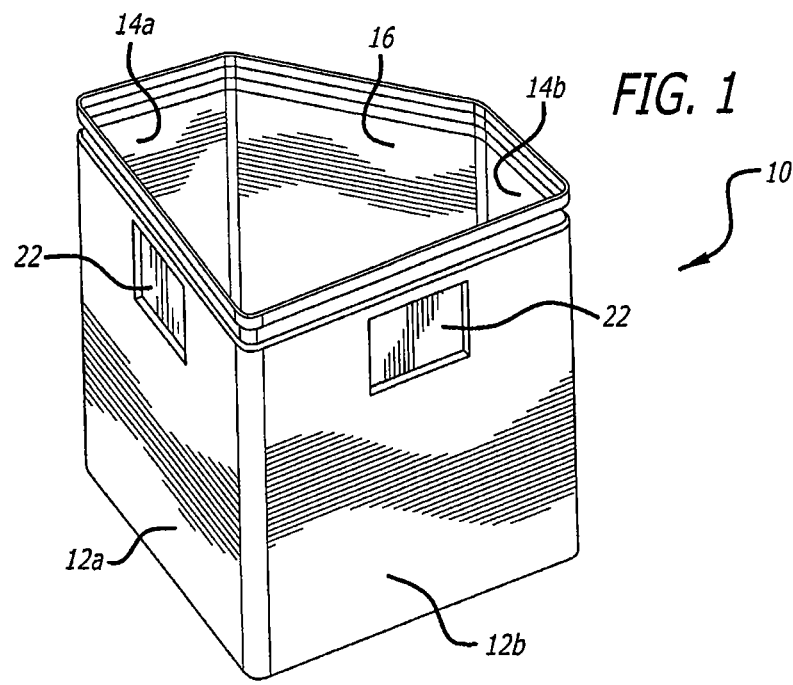
FIG. 1 is an elevated perspective view of a waste bin of the present invention.
Figure 2:
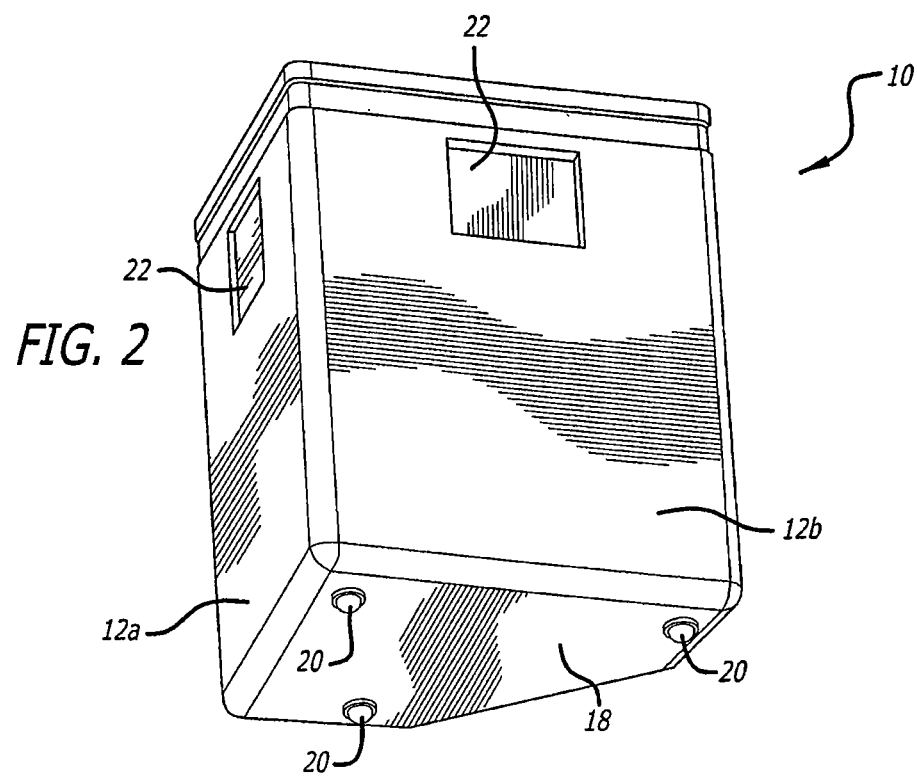
FIG. 2 is a lower perspective view of the waste bin of FIG. 1.

FIGS. 1 and 2 illustrate an exemplary waste bin 10 of the type used with the present invention, having first and second main orthogonal walls 12a,b, first and second short walls 14a, 14b, and a traverse wall 16 connecting the two short walls. The bin 10 further includes a floor 18 that is preferable fitted with wheels or castors 20 that allow the bin to be rolled along a smooth surface. The first and second main walls 12a,b can include apertures or, more preferably, recesses 22 that serve as handles for better grasping of the bin 10. The five walls 12a, 12b, 14a, 14b, 16 form a diamond shape (top view) reminiscent of a home plate in baseball, although the shape is not essential to the invention and many other shapes will work with the present invention. The compartment 24 can also be formed with a small ramp 84 (see FIG. 8) that is inclined away from the fifth wall 32 such that the bin 10 will lean into the compartment 24 and against walls 34a,b and 36 to support the bin and prevent rattling.

Figure 3:
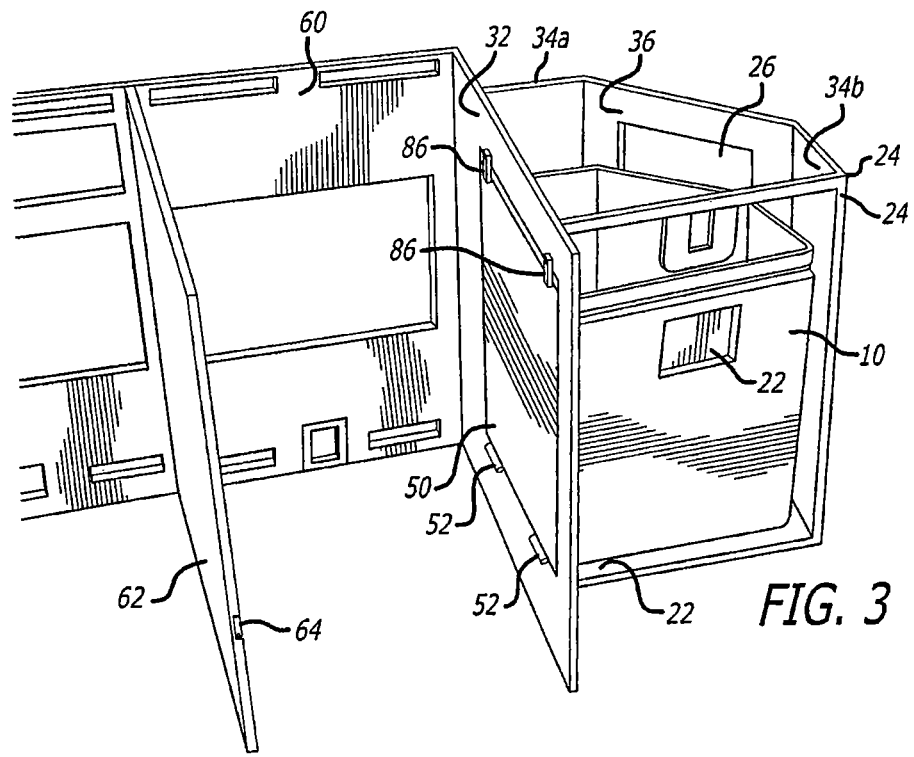
FIG. 3 is an elevated perspective view of a first preferred embodiment of the bin and extractor of the present invention.
Figure 4:
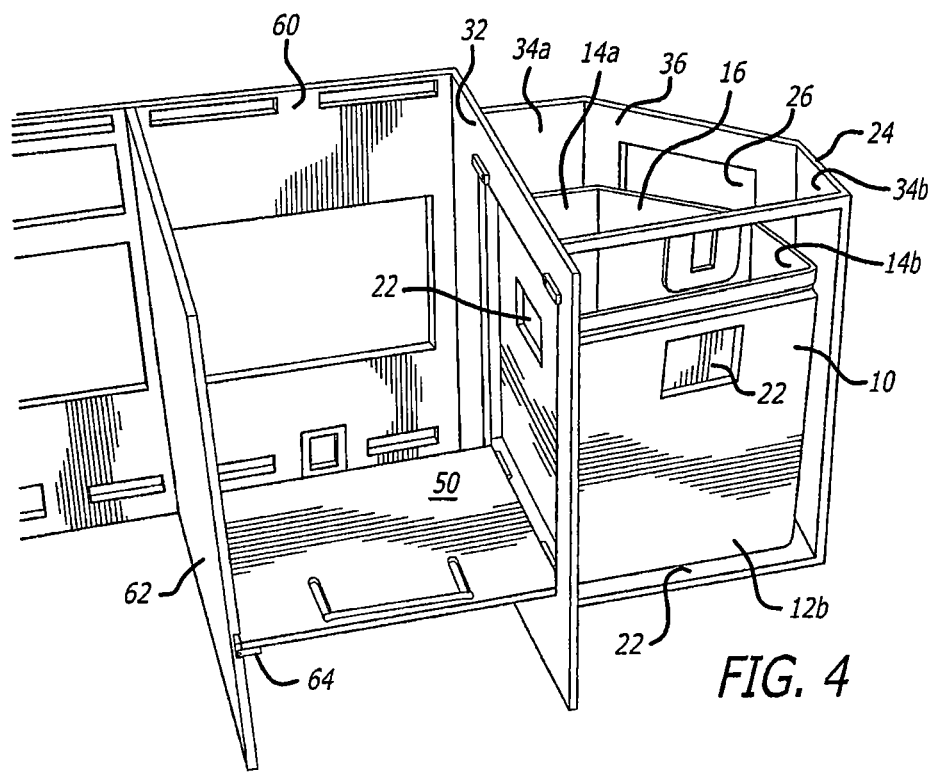
FIG. 4 is an elevated perspective view of the bin and extractor of FIG. 3 with the floor extended.

FIGS. 3 and 4 illustrate the bin 10 in a designated storage compartment 24 that is shown with one wall removed for clarity. The compartment 24 is open at the top so that waste may be deposited in the bin 10 through an opening 26 in the compartment. The compartment 24 is shaped to conform with the exterior surfaces of the bin 10, including a compartment traverse wall 36 aligned and adjacent to the bin traverse wall 16, first and second compartment short walls 34a,b corresponding to the respective bin short walls 14a,b, and a first main wall (not shown) aligned with and adjacent the bin main wall 12b. This allows the bin 10 to be surrounded inside the housing to prevent or reduce rattling of the bin 10 during flight.

The compartment 24 includes a fifth wall 32 adjacent to the bin's main wall 12a that is also part of a larger secondary structure, namely an extraction chamber for extracting the bin 10. The wall 32 is formed with a draw bridge type swinging platform 50 that extends downward from the wall 32 as shown in FIGS. 3 and 4. The swinging platform 50 is connected by one or more hinges 52 along a lower surface that allows the platform 50 to deploy into a horizontal position (FIG. 4). In the horizontal position, the platform 50 is substantially co-planer with the floor 22 of the compartment 24 to form a smooth horizontal transition from the compartment 24 to the extraction chamber, whereby the waste bin 10 can roll smoothly between the compartment 24 and the extraction chamber without lifting the bin and with minimal effort. The extraction chamber is formed by a rear wall 60 and an orthogonal side wall 62 along with the adjoining fifth wall 32 of the compartment.

When the platform 50 is lowered, the void in the wall 32 forms a window through which the bin 10 can pass through. The width of the window is sufficient to accommodate the waste bin 10 plus a few inches on each side. The fifth wall 32 can also include tabs 86 that maintain the platform in a vertical orientation, and can be rotated away from the platform to release the platform 50 so that it can rotate to its horizontal position. Other securing mechanisms can also be used to prevent the platform 50 from inadvertently dropping into the extraction compartment. To support the platform 50 and the bin 10, the side wall 62 of the extraction compartment may include supports 64 that can extend out of the wall, or alternative a ledge or dowel affixed to the side wall 62 will work to help stabilize the platform 50 and prevent it from bowing or dipping when the heavy bin 10 is transferred thereto.

Figure 5:
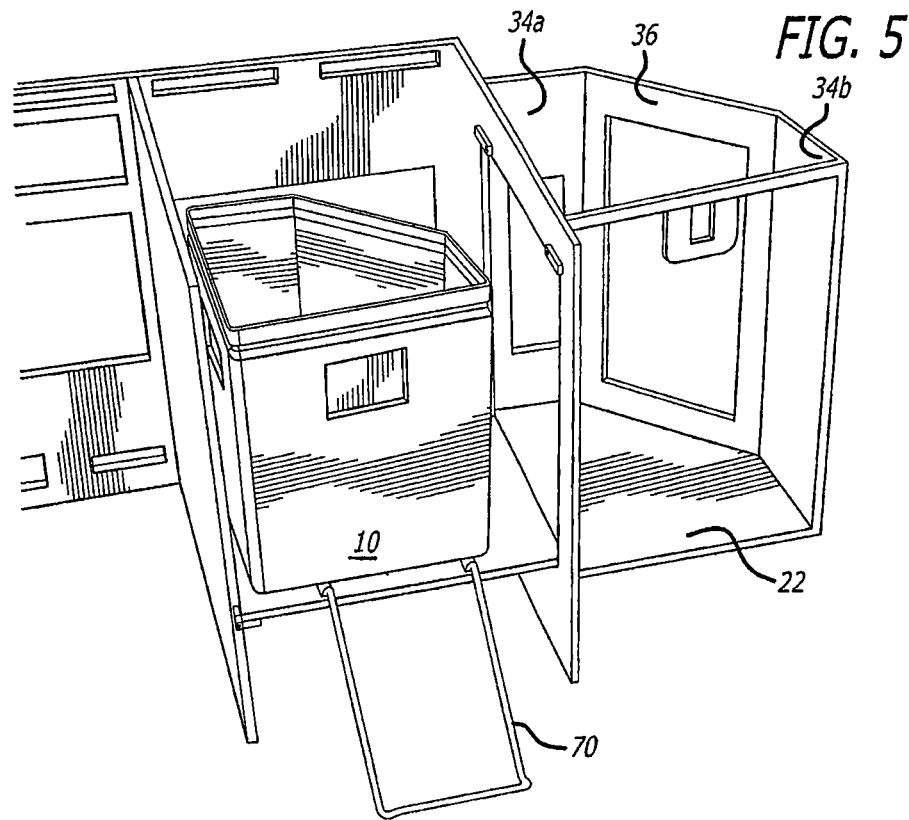
FIG. 5 is an elevated perspective view of the bin and extractor of FIG. 3 with the ramp deployed.
Figure 6:
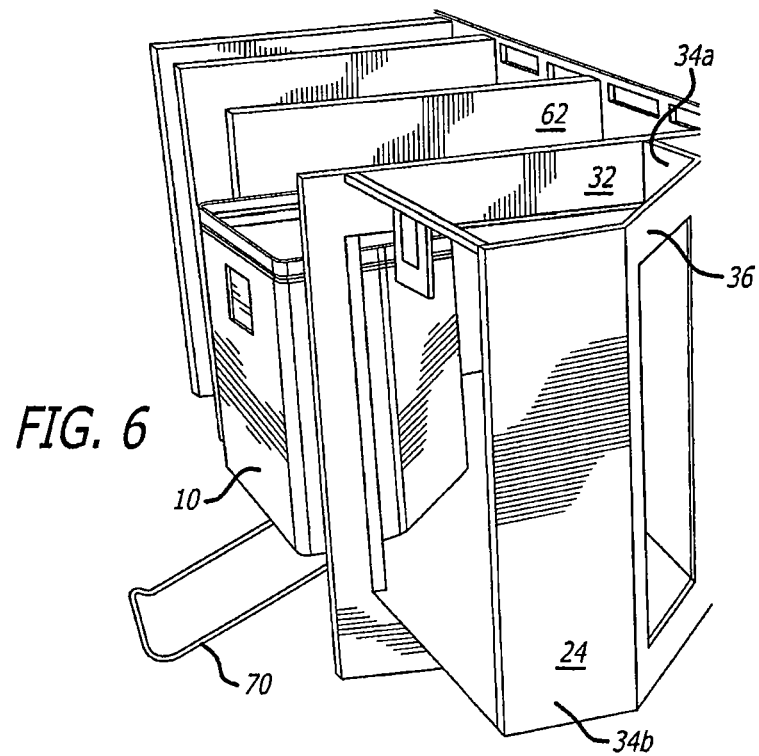
FIG. 6 is another elevated perspective view of the bin and extractor of FIG. 3 with the ramp deployed.
Figure 7:
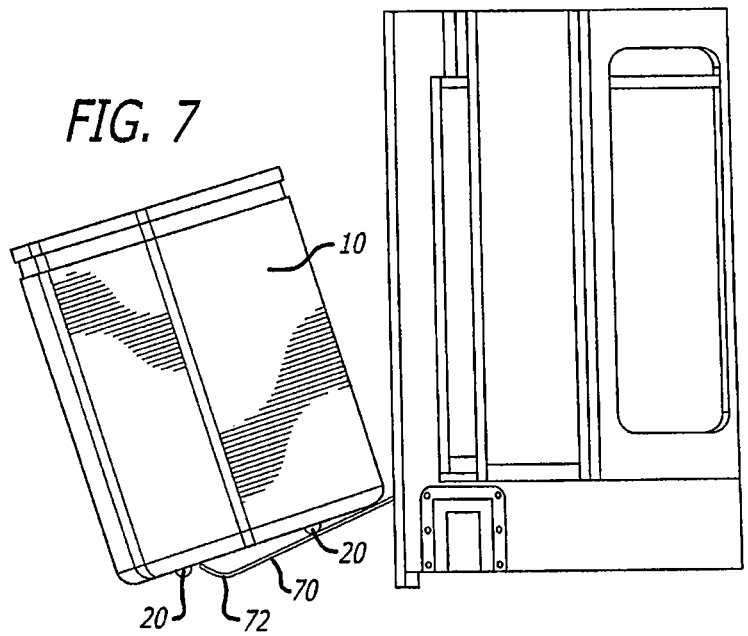
FIG. 7 is a side view of the waste bin moving down the ramp.
Figure 8:
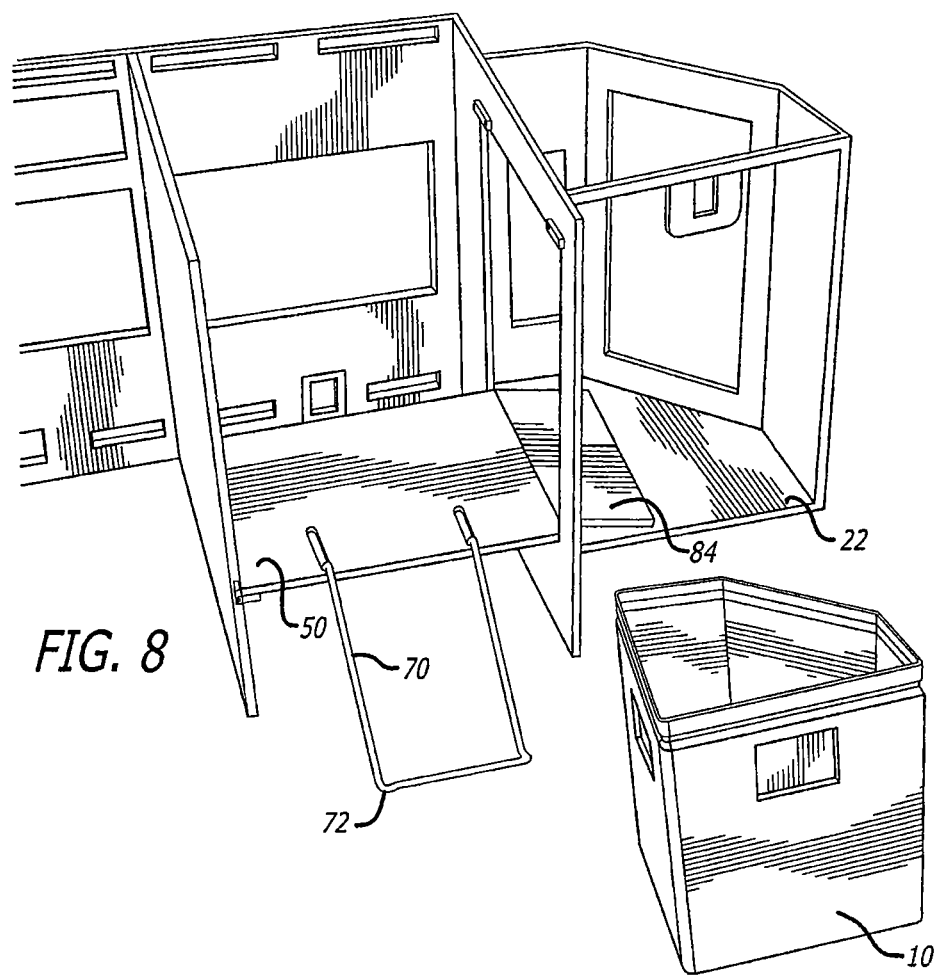
FIG. 8 is a view of the extractor after the bin has been removed.

In FIGS. 5 and 6, a ramp or set of rails 70 is extended from a retracted position in the platform 50 to form a slide from the edge of the platform 50 to the ground on which the waste bin 10 can ride to the ground. The ramp or rails 70 in a first embodiment can be held in a slot in the platform 50 for easy extension and reinsertion, although the ramp may be secured in other manners or operate as a separate component that is attached when needed. With the ramp 70 extended from the platform 50 to the ground as shown in FIGS. 5 and 6, the waste bin 10 can be slid down the ramp 70 from the extraction compartment to the ground as shown in FIGS. 7 and 8. The ramp 70 may include an up-turned distal end 72 to decelerate the waste bin 10 before it reaches the end of the ramp as a safety precaution.

The present invention can be modified in a number of ways, and one of ordinary skill in the art would readily understand and appreciate various modifications within the scope of the present invention. Thus, the scope of the present invention should not be limited to any depiction or description herein, but rather the scope of the invention should include all such modifications and alternate embodiments. Accordingly, the invention is limited only by the words of the appended claims, using the common and ordinary meanings of the words therein.

We claim:

1. An aircraft galley waste bin extraction unit comprising:
    a non-rectangular waste bin;
    a first compartment having a plurality of walls that conform with the non-rectangular waste bin;
    an extraction chamber adjoining the first compartment and sharing a common wall with the first compartment, and further including a side wall opposite the common wall and including a retractable projection;
    a platform within the common wall and pivoting about a lower edge from a vertical position to a horizontal position against the retractable projection, and
    a ramp extendable from the platform to a position outside of the extraction chamber.

2. The aircraft galley waste bin extraction unit of claim 1, wherein the ramp comprises a pair of rails that extend from within the platform.

3. The aircraft galley waste bin extraction unit of claim 2, wherein the ramp includes an upturned distal end when extended from the platform to stop the waste bin.

4. The aircraft galley waste bin extraction unit of claim 1, wherein the common wall includes tabs to retain the platform in the vertical position.

5. The aircraft galley waste bin extraction unit of claim 1, wherein the first compartment includes a ramp for directing the waste bin away from the common wall.

6. The aircraft galley waste bin extraction unit of claim 1, further comprising casters on a bottom surface of the non-rectangular waste bin that allow the bin to roll along a smooth horizontal surface.

* * * * *